May 7, 1935. J. F. KOHLER 2,000,761
DEVICE FOR FEEDING PLATES ONTO A CONVEYER
Filed May 31, 1933 5 Sheets-Sheet 1

INVENTOR
John F. Kohler
BY
Charles G. Newsky
ATTORNEY

May 7, 1935.  J. F. KOHLER  2,000,761
DEVICE FOR FEEDING PLATES ONTO A CONVEYER
Filed May 31, 1933  5 Sheets-Sheet 3
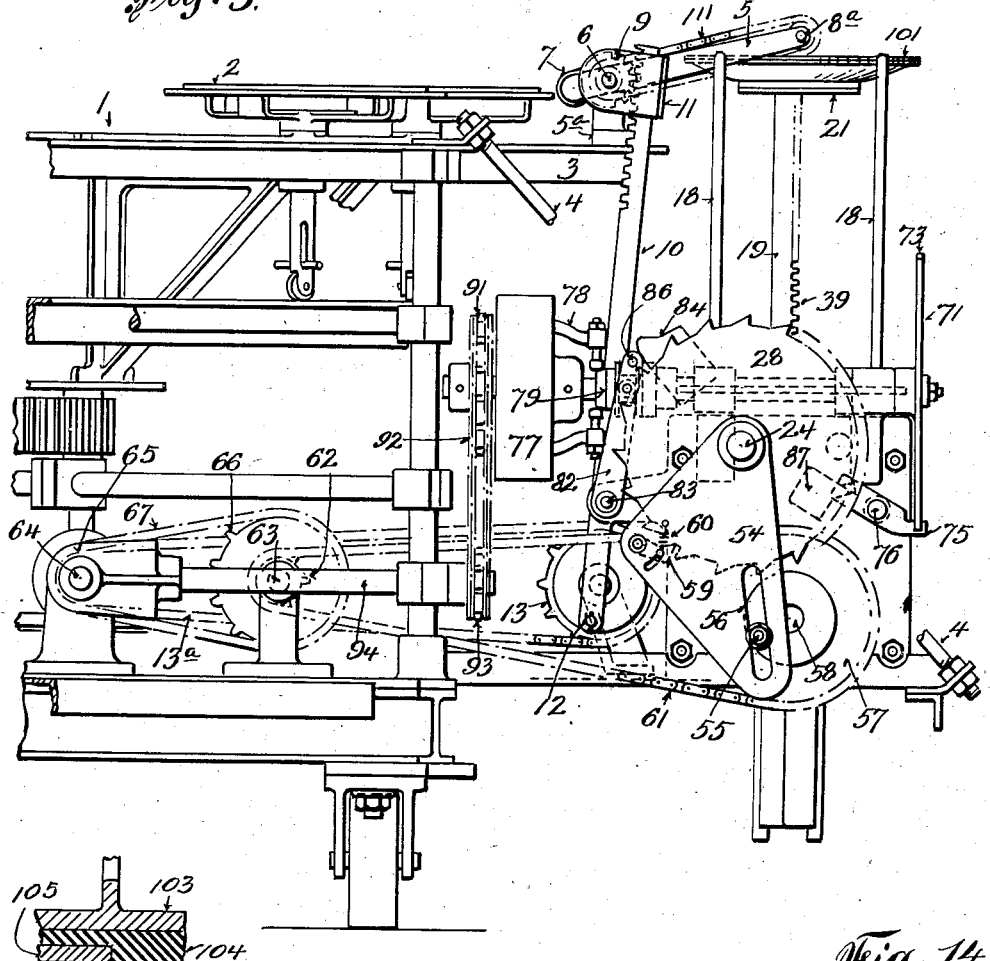
Fig. 3.
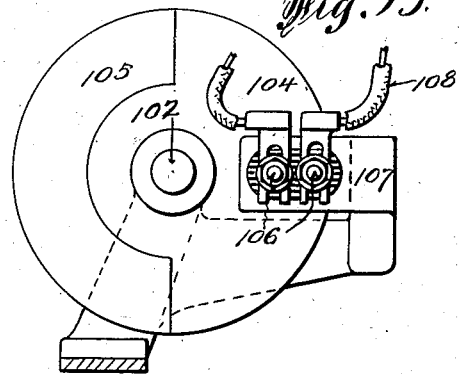
Fig. 12.
Fig. 13.
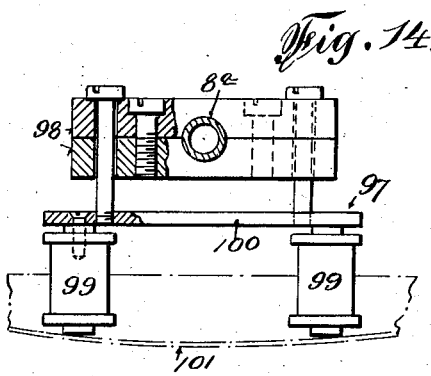
Fig. 14.
INVENTOR
John F. Kohler
BY
Charles G. Hensley
ATTORNEY May 7, 1935. J. F. KOHLER 2,000,761
DEVICE FOR FEEDING PLATES ONTO A CONVEYER
Filed May 31, 1933 5 Sheets-Sheet 4

INVENTOR
John F. Kohler
BY
Charles G. Nemsky
ATTORNEY

May 7, 1935. J. F. KOHLER 2,000,761
DEVICE FOR FEEDING PLATES ONTO A CONVEYER
Filed May 31, 1933 5 Sheets-Sheet 5
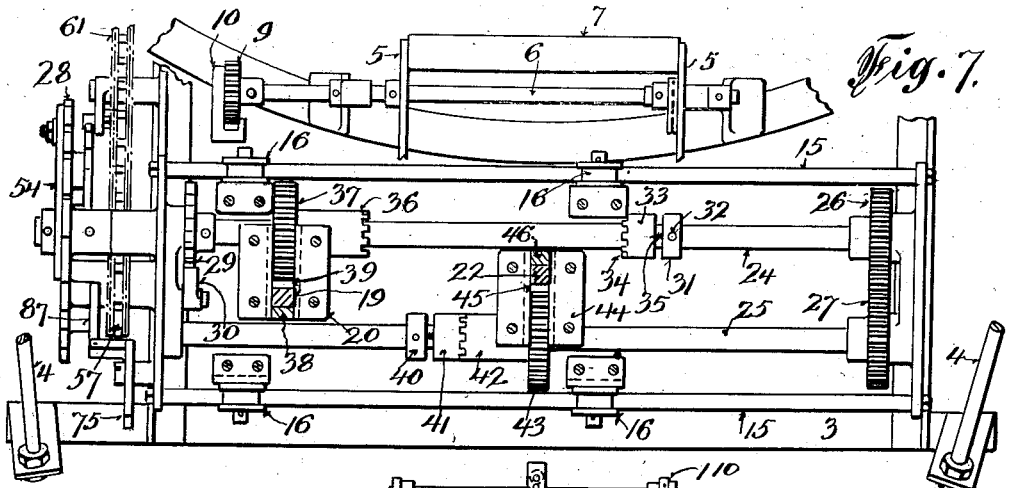
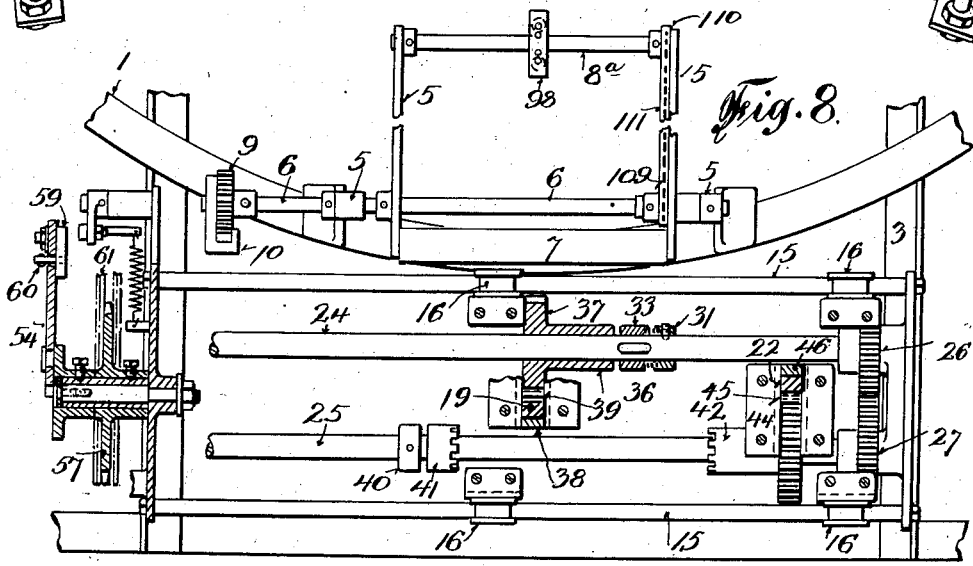
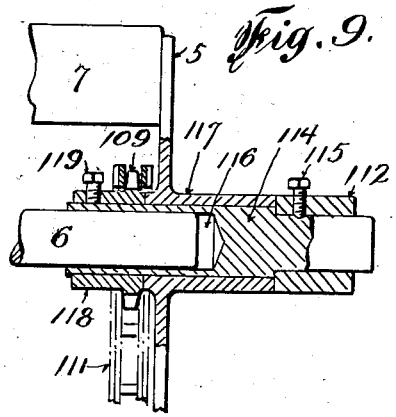
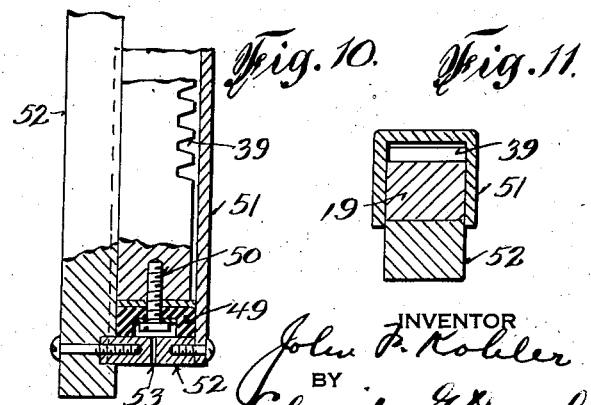
INVENTOR
John F. Kohler
BY
Charles G. Hensley
ATTORNEY Patented May 7, 1935

2,000,761

UNITED STATES PATENT OFFICE 2,000,761

DEVICE FOR FEEDING PLATES ONTO A CONVEYER

John F. Kohler, White Plains, N. Y.

Application May 31, 1933, Serial No. 673,707

14 Claims. (Cl. 214—8.5)

In my co-pending application Serial No. 633,275 I have shown and described a circular pie making machine which includes a carrier or turret having plate holders revolving in a circular path. While the present invention is adapted to be applied to that machine for the purpose of automatically feeding the plates onto the conveyer, it will be understood that the present invention is not necessarily limited in its application to that particular type of machine.

The object is to feed metal plates such as metal pie plates in which pies are to be baked, individually, onto the plate holders of the carrier of a pie making machine or on any other type of carrier which is adapted to receive plates or other members in successive order as the carrier moves in relation to the plate feeding apparatus.

I have shown the present machine as connected up with and driven in synchronism with the machine shown in my said co-pending application in order to show one embodiment of my invention. The present invention includes a plate carriage adapted to be shifted in position and on which a plurality of stacks of plates are adapted to be placed. While this carriage is in one position the plates are automatically lifted and are taken singly from the top of one stack and placed one by one upon the plate holders. When the plates of this stack are exhausted, the carriage is shifted in position and the plates are taken from the top of the second stack.

While the plates are being fed from the second stack an attendant may supply a new stack of plates in the position from which the first stack was taken. Thus, the plates are alternately taken from a plurality of stacks so that there is no intermission in the feeding action of the present apparatus and there is ample time for the attendant to supply fresh stacks to the carriage.

There is a device arranged to take plates individually from the top of the stack by magnetic action, that is to say, it is adapted to lift the plates magnetically, swing the plates into position over the plate holder of the turret and then release the plate so that it falls into position on the turret.

These operations are all so timed that one plate is placed on each plate holder of the turret as it comes into position to receive it. Other objects and advantages will be set forth in the following detailed description of my invention.

In the drawings forming part of this application,

Figure 3 is an end elevation thereof,

Figure 4:
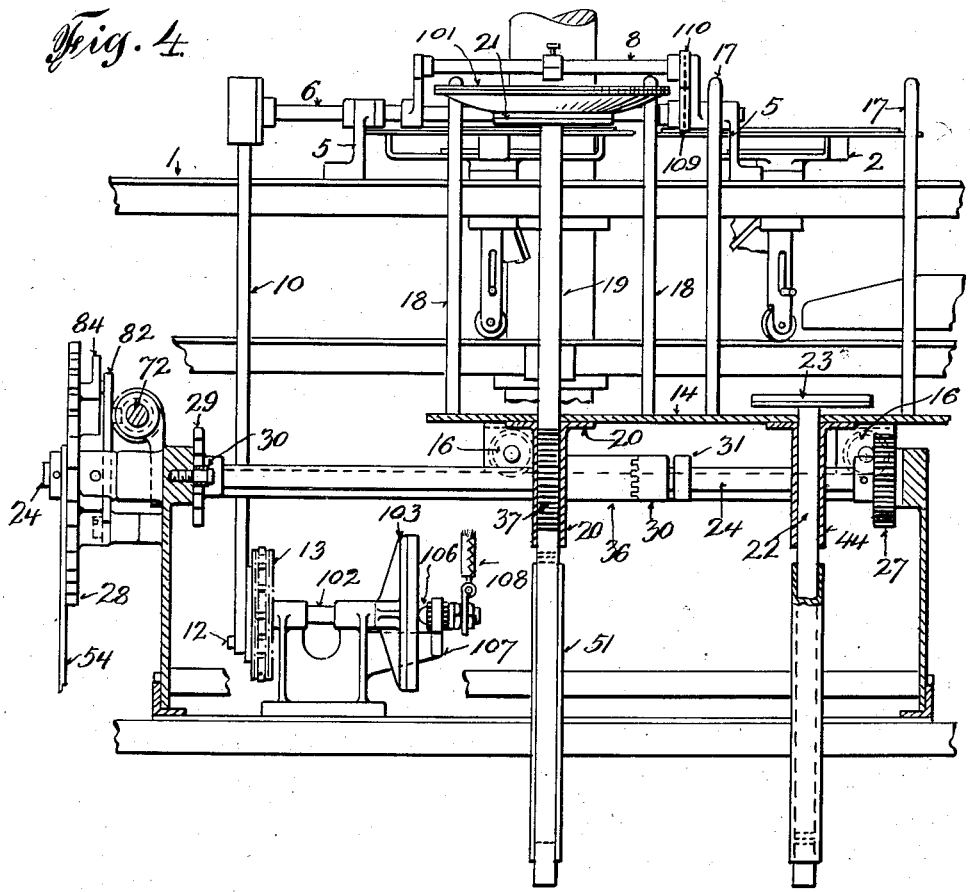
Figure 5:
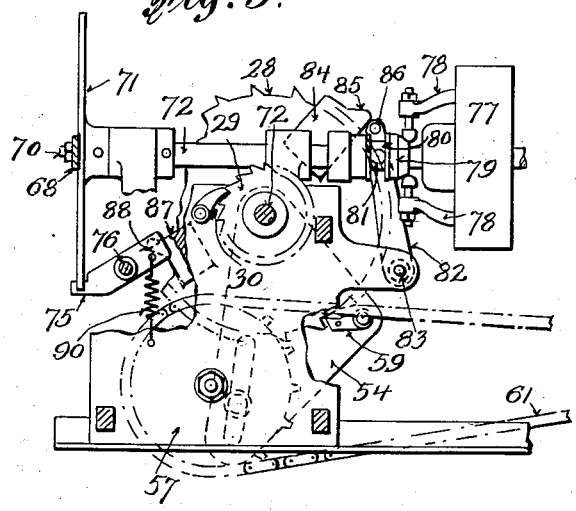
Figure 6:
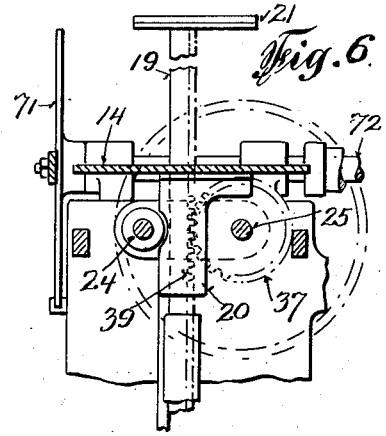

Figure 4 is a sectional view showing principally the carriage for holding the stack of plates, Figure 5 is an elevation with parts broken away, of parts of the drive mechanism, Figure 6 is a sectional view showing the device for raising the stack of plates on the carriage, Figure 7 is a sectional view showing the means for alternately raising the plurality of stacks on the carriage, Figure 8 is a sectional view showing similar parts and also the plate lifting member, Figure 9 is a sectional view showing a part of the plate lifting device, Figure 10 is an elevation, partly broken away, and showing part of the plate lifting device, Figure 11 is a detailed sectional view, Figure 12 is a detailed sectional view of part of the plate lifter, Figure 13 is a sectional view showing part of the plate lifter in elevation, and Figure 14 is an elevation with parts broken away and showing the magnets for lifting the plates.

In the drawings I have shown part of the turret 1 for conveying plates in a circular path while having pie crust dough and filler applied thereto, and this corresponds with the turret in my said co-pending application. This turret revolves in a circular path and there are arranged on it circular plate holders 2 each adapted to receive and hold a pie plate, where the invention is applied to a pie machine, and these pie plates travel in a circular path around the axis of the turret. My present apparatus is arranged to supply plates to the plate holders 2 before the plate is conveyed under the first dough supplying apparatus.

I have shown a framework 3 attached to the framework of the pie making machine by braces 4 to fix the position of the feeding device in relation to the pie making machine at such a point in the circumference of the latter that the present device will supply plates to the plate holders 2 just before the plates are carried under the first dough supplying apparatus.

In an upper position or above the horizontal plane of the plate holders 2 I have shown a pair of arms 5 arranged parallel to each other and connected by a lateral shaft 6 on which the magnetic device is mounted. The opposite ends of the arms, that is, the portions which are on the opposite side of the axis of the cross shaft 6 there is mounted a counterweight 7 which serves to counterbalance the plate engaging magnets in order to make the mechanism run smoothly.

The magnetic plate gripping device carried on the shaft 8 extending between the arms 5 is adapted to pick up the plate on the top of the stack when in the position shown in Figure 3, and when the arms 5 are swung over anti-clockwise in Figure 3, the magnet carries a plate to a position directly over one of the plate holders 2 and then releases the plate in order to drop it onto the holder. In order to oscillate the plate holder I have shown a gear 9 mounted on the end of the shaft 6 and this is rocked or oscillated by means of the rack bar 10 which slides vertically in the guiding bracket 11 and serves to oscillate the arms 5.

The magnets remain perpendicular while traveling from the position over the stack of plates until it reaches the position over the plate holder 2. In other words, the plate remains in a horizontal plane while being lifted from the stack onto the plate holder. It will be understood that these plates are made of iron or other magnetic metal so that they may be attracted by the magnets and carried from the stack onto the holder.

The rack bar 10 is given a reciprocating motion because it is connected by a pin 12 to the face of the sprocket wheel 13 the latter being driven in the manner hereinafter described.

The carriage for holding the stacks of plates includes a top plate 14 equal in width to the largest size plates which are to be handled, and corresponding in length with the diameter of two or more plates in order to receive a plurality of stacks thereon. This carriage is mounted to reciprocate on the bars 15 (see Fig. 7) and is provided with grooved rollers 16 which rest upon and travel along these bars to make the carriage easily movable in the direction of its length. The carriage is provided with vertically extending posts to hold the stack of plates from being disturbed on the carriage and for this purpose I have shown four posts 17 for confining one stack of plates and adjacent thereto four posts 18 for confining another stack of plates.

It will be understood that the plates are always taken at the same position and the carriage is made movable merely to bring a new stack into position after one stack has been removed from the carriage.

Where the carriage is designed to hold two stacks of plates, there will be two stack lifters arranged centrally in relation to the several sets of posts 17, 18. There is a post 19 extending through the plate 14 of the carriage and between brackets 20 mounted on the under side of this plate. This post is adapted to move vertically and it has a top disc 21 on which a stack of plates is received so that when the post 19 is moved upwardly step by step it lifts the stack of plates, which are taken singly from the top of the stack and placed on the plate holders 2.

There is another similar post 22 also movable vertically and having a top plate 23 to receive another stack of plates thereon and to lift the same vertically between the posts 17.

These posts 19, 22 are preferably lifted step by step in increments equal to the thickness of the individual plates, so that for each operation of the plate lifter the active stack is moved up to bring the top plate in the same position as the plate previously removed from the stack.

Figure 1:
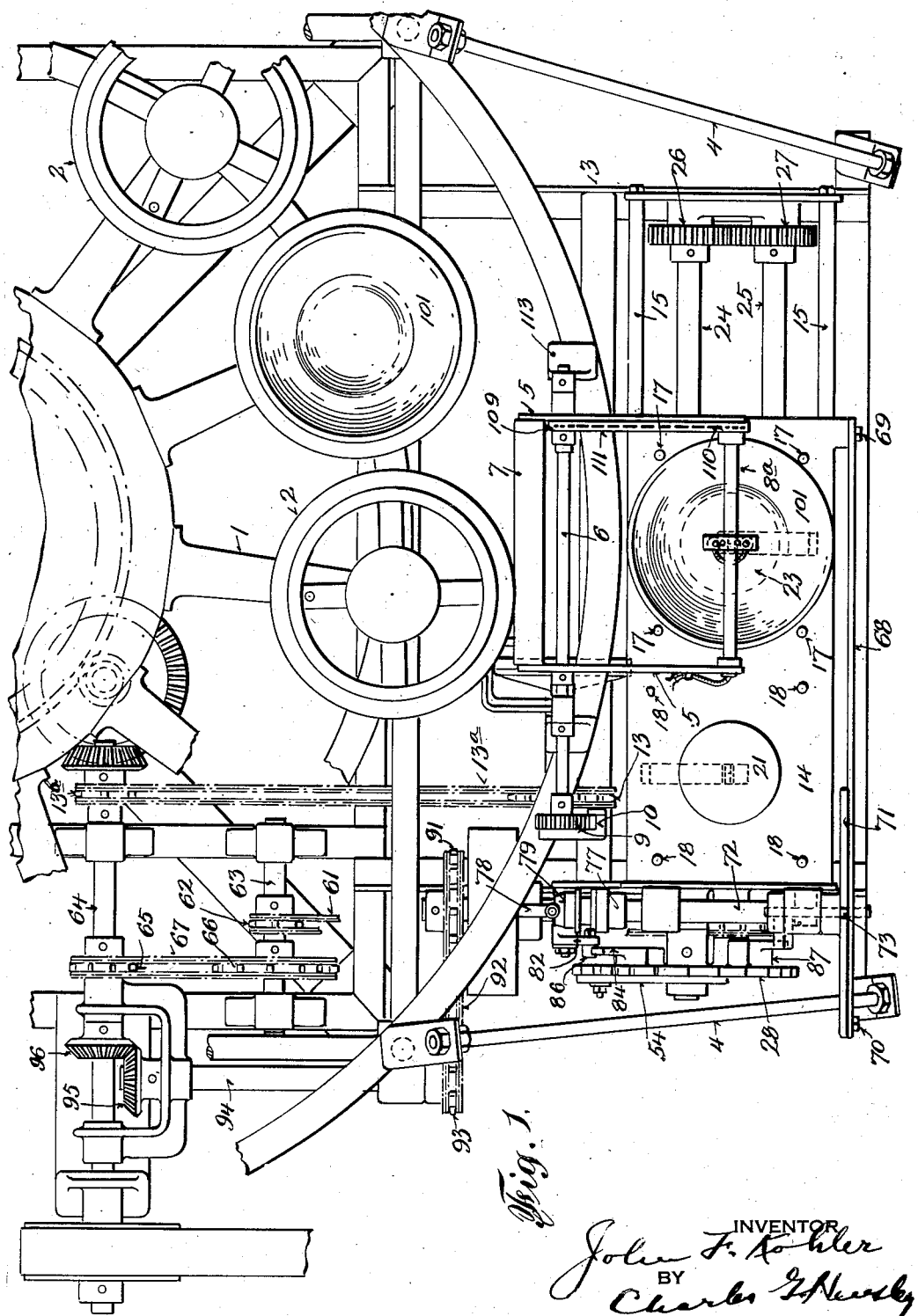
Figure 1 is a plan view showing a portion of the turret of a pie making machine such as is shown in my said co-pending application and also illustrating the apparatus forming the subject matter of my present invention.
Figure 2:
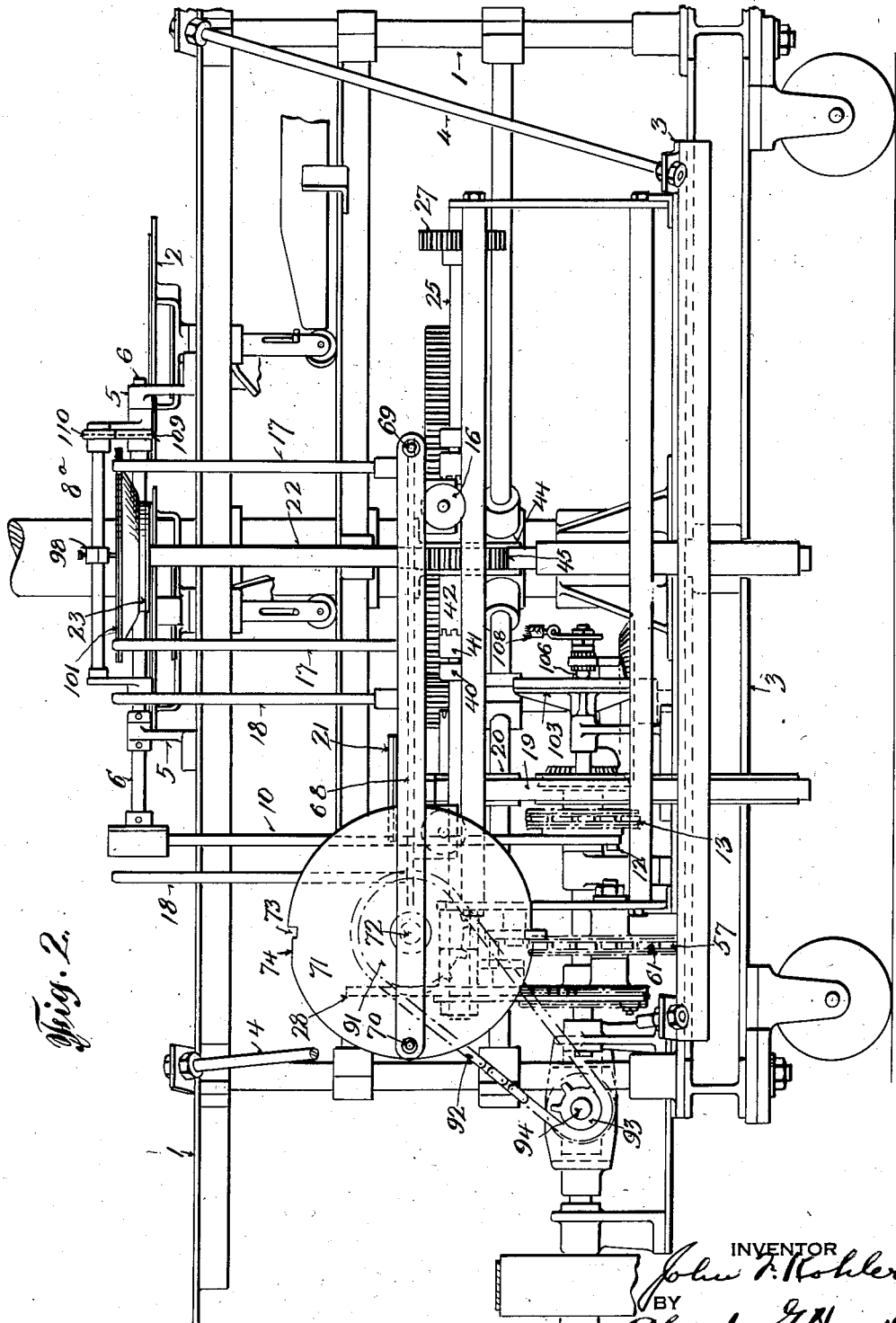
Figure 2 is a front elevation thereof.

The posts 19, 22 are brought alternately into register with the plate lifting device, as shown in Figure 2, and the raising of either post takes place only when it is positioned in vertical alignment with the plate lifter. To accomplish this I have provided the following mechanism:

As shown in Figure 7, there are two parallel shafts 24, 25 mounted on the frame of the present device below the carriage and these shafts are geared to move together by means of the intermeshing gears 26, 27, arranged on the right hand ends of these shafts in Figure 7. The shaft 25 is driven through these gears from the shaft 24. The latter, which is the upper shaft in Figure 7, projects through the frame and on one end it carries a ratchet wheel 28 which is operated in the manner hereinafter described, intermittently in one direction. There is a ratchet wheel 29 attached to the shaft 24 inside the frame and a hold-back or detent pawl 30 engages the teeth of this ratchet to prevent retrograde movement of the shaft 24.

On the upper shaft 24 there is a collar 31 secured adjustably to the shaft by means of a set screw 32 and associated with this collar is a clutch member 33 having clutch teeth 34 facing to the left in Figure 7. There is a cushioning spring 35 between the collar 31 and the clutch member 33. There is arranged to slide freely along the shaft 24, a second clutch member 36 which is formed on one end of the hub of a gear 37.

There are angular brackets 20 as stated above, bolted to the under side of the table or platform of the carriage and these lie on opposite sides of the gear 37. At one end of these brackets there is an intermediate block 38 to form a guide for the reciprocating post 19. This post is provided with rack teeth 39 which mesh with the gear 37 so that the latter may raise the post 19 whenever the gear is driven. The post itself is guided to move in an aperture in the carriage plate 14 and between the angle plates 20 and the intervening member 38. The gear 37 is driven only when the clutch member 36 interlocks with the clutch member 33 which will be when the carriage is shifted to the right in Figure 7 as will be more fully explained in the description of the operation.

On the lower shaft 25 in Figure 7 there is mounted a collar 40 corresponding with the collar 31, and there is also a clutch member 41 which revolves with the collar and with the shaft 25 but the clutch faces in the opposite direction to the clutch 33 on the shaft 24. The co-operating clutch member 42 is formed on the hub of the gear 43 and this clutch member faces in the opposite direction to the clutch member 36. The gear 43 and its hub are loose on the shaft 25 so that they revolve with the shaft only when the two clutch members 41, 42 are in locking engagement with each other which will be when the parts are in the position shown in Figure 7.

The angle plates 44 correspond with the plates 20 but face in the opposite direction, and they are secured to the plate 14 of the carriage. The post 22 has rack teeth 45 which mesh with the gear 43 and this post is disposed above the gear 43 as viewed in Figure 7, whereas the post 19 is a disposed below the gear 37 in this figure because the two shafts 24, 25 revolve in opposite directions and for this reason the posts are disposed on opposite sides of the respective gears 37, 43.

There is also a guiding block 46 fixed between the ends of the brackets 44 to form the third side of a pocket or raceway for the post.

It will be obvious that the carriage may be shifted right and left as viewed in Figure 7 and when in the left hand position, as shown in this figure, the clutch members 41, 42 will be engaged and the gear 43 will be operating upon the rack teeth 45 to raise the post 22 which latter is at that time in alignment with the plate lifting device. When the carriage moves to the right in Figure 7 the two clutch members 41, 42 will be disengaged because the gear 43 and its hub, as well as the post 22 will move to the right with the carriage.

When this shifting of the carriage to the right takes place, therefore, the gear 43 will cease to raise the post 22. While the carriage is in the position indicated in Figure 7, the clutch member 36 is disengaged from the clutch member 33 and the gear 37 is at that time not in a position to be operated. However, when the carriage is moved to the right, as just described, the clutch members 41, 42 are automatically disengaged as stated above, and the clutch member 36 is moved into engagement with the clutch member 33 at the time the post 19 comes into vertical alignment with the plate lifting device. The gear 37 will now be revolved with the shaft 24 and it will act on the rack teeth 39 of the post 19 to raise the latter.

It will be apparent from the above that when the carriage is in the position shown in Figure 7 the post 22 is moved upwardly by the gear 43 which at this time is driven with the shaft 25 through the engagement of the clutch members 41, 42. On the other hand, when the carriage is moved to the right the clutch members 41, 42 disengage as the gear 43 is shifted along the shaft 25.

At the same time the gear 37 slides along the shaft 24 to the right in Figure 7 until the clutch members 36, 33 engage, whereupon the gear 37 revolves with its shaft 24 and it raises the post 19.

It is not necessary to propel the posts downwardly after the stack has been lifted. As the clutch members disengage, the gear 37 or the gear 43, as the case may be, is free to revolve upon its respective shaft, and the weight of the post and its top member will cause the corresponding gear to turn backwardly or in the reverse direction to its movement when being driven from its shaft.

In order to cushion the downward movement of each post, I have provided a washer 49 attached to the bottom end of each post by means of a screw 50 and this washer engages against the three sides of the tubular housing 51 and one side of the member 52 so that the air within the chamber formed by these members is compressed upon the downward stroke of the post. At the bottom of the tubular member 51 there is attached the plug 52 for closing the end of the raceway in which the post moves, and this plug is provided with a small aperture 53 to permit the slow escape of air under the post. These parts, in other words, form a dash pot to cushion the downward fall of the post. The construction is the same for both posts.

As stated above, the two shafts 24, 25 are revolved through power applied to the upper one 24. On one end of this latter shaft, which projects beyond the frame, there is a large ratchet wheel 28 which is fixed to the shaft. There is a triangularly shaped lever 54 loosely pivoted on the shaft 24 and this lever is rocked by means of a crank pin 55 which engages in the slot 56 of the lever, the pin being fixed to one side of the sprocket 57 mounted on the stud shaft 58.

As this sprocket 57 revolves, it causes an oscillating movement of the lever 54. Adjacent one of the angular portions of this lever there is pivotally mounted a pawl 59 the point of which is adapted to enter between the teeth of the ratchet wheel 28 so that as the lever 54 is oscillated, the ratchet is advanced one tooth in a counterclockwise direction as viewed in Figure 3, for the purpose of turning the shaft 24 step by step.

As the two shafts 24, 25 are geared together the step by step movement affects both of these shafts and causes the posts to be singly raised step by step about the thickness of a plate. There is a spring 60 connected with a stationary pin on the lever 54 and with a pin on the side of the pawl 59 to hold the latter in engagement with the teeth of the ratchet wheel 28. As was explained above, the ratchet wheel 29 on the shaft 24 is engaged by a detent 30 to prevent retrograde movement of the shaft 24 when the pawl 59 is escaping the teeth of the ratchet 28.

The sprocket wheel 57 referred to above is driven by an endless chain 61 which is driven by a small sprocket 62 arranged on a shaft 63. This shaft is driven from the main or power shaft 64 by means of the sprocket wheel 65 mounted on the latter, the sprocket wheel 66 mounted on the short shaft 63, and the endless chain 67 running over these sprocket wheels. Through these connections power is transmitted from the main shaft to the mechanism which drives the plate lifting posts and there is a speed reduction through the difference in sizes of the two sprockets 62, 57 as well as through the difference in the sizes of the sprockets 65, 66.

*Carriage shifting mechanism.*—There is a link 68 shown clearly in Figure 2, one end of which is pivotally connected at 69 with the reciprocating carriage.

This link, driven in the manner to be described, moves the carriage back and forth along the rails 15 for the purpose of bringing the posts 19, 22 alternately in position to deliver plates to the plate lifting device. The opposite end of this link is pivoted at 70 to the face of the disc 71 which is mounted on a shaft 72. This disc is shown as having two notches 73 disposed opposite each other and extending inwardly from the edge of the disc. One side of the notch is full while the other is slanted off as shown at 74.

There is a pawl 75 pivoted on the pin 76 and the forward end of this pawl is adapted to engage in the notches 73 of the disc 71 each time the disc is revolved one half revolution, which corresponds with the right and left positions of the carriage; so that the latter is held in either of its extreme positions while the stack of plates is being removed therefrom.

As shown in Figure 5, there is a clutch 77 arranged to revolve on the shaft 72. This is an ordinary disc or slip clutch which is adapted to be operated when it is thrown into active condition by the lever arms 78 carried by the clutch. These arms are adapted to be thrown out to render the clutch active by means of the cone shaped member 79. This cone shaped member is provided with a circumferential groove 80 in which engages a pin or roller 81 carried by the lever arm 82 which is pivotally mounted on a portion of the frame at the point 83. The rocking of the lever arm 82 causes the cone shaped member 79 to be shifted along the shaft 72 for the purpose of operating the arms 78 to throw the friction clutch into or out of operation.

There is a tripping member 84 mounted on one side of the ratchet wheel 28 and this member has a nose 85 which engages the pin 86 also carried by the lever arm 82.

At each revolution of the ratchet wheel 28 the tripping member 84 engages the pin 86 and it causes the lever arm 82 to be swung to the right in Figure 5, thereby operating the arms 78 to throw the friction clutch into operation. When this clutch is thrown into operation the shaft 72 on which the disc 71 is carried will be revolved.

There is also attached to the side of the ratchet wheel 28 a tripping member 87 which engages in the notch 88 in the rear arm of the pawl 75. The spring 90 attached to one end of the same arm and to a stationary pin on the frame, normally holds the pawl 75 in the position shown in Figure 5 in which position one end of the pawl engages in one of the notches 73 of the disc 71. During the revolution of the ratchet wheel 28 the tripping member 87 acts on the rear arm of the pawl 75 to release the pawl from the notch of the disc 71 in order to unlock this disc and permit it to be revolved; and immediately thereafter the tripping member 84 engages the pin 86 and rocks the lever 82 to throw the slip clutch into operation so that the disc 71 will be revolved. The operation will continue until the disc has made a half revolution, at which time the pawl 75 will enter the opposite notch 73 in the disc 71 and lock the latter against further revolution.

The tripping member 84 will disengage from the pin 86 just about the time the disk 71 completes one half revolution. Whenever the disc 71 is revolved a half revolution it will operate through the link 69 to shift the carriage to the right or left to bring the stack lifting devices alternately into operative position.

On the side of the clutch 77 opposite the lever arms 78 there is a sprocket wheel 91 over which engages the endless chain 92 and this chain also engages over the sprocket 93 which is mounted on the shaft 94.

On the end of this shaft opposite the sprocket 93 there is a mitre gear 95 which meshes with and is driven by the mitre gear 96 on the main shaft 64. Power is transmitted, therefore, from the main shaft through these gears, sprockets and chains to the slip clutch device for the purpose of driving the carriage back and forth along its tracks.

The electromagnet 97 shown in Figure 14 is mounted on the bars 98 clamped on the shaft 8 of the plate lifting device and it consists of the two spools 99 each having a pole piece connected by the iron bar 100 leaving the opposite poles exposed to act on the intervening portion of the pie plate 101 as shown in Figure 14. When current is sent through these spools the magnet becomes active and grips the pie plate, as shown in Figure 14, and it continues to grip the plate until the latter has been swung over the plate holder 2 of the turret, whereupon the current is broken and the magnet drops the plate onto the plate holder.

On the shaft 102 there is mounted a revolvable make and break device consisting of a supporting member 103 having mounted thereon an insulating plate 104. There is set into a recess in this insulating plate an arcuate shaped contact member 105 to lie flush with the outer surface of the insulating member 104. There are two contact members or brushes 106 which are mounted on and insulated from the bracket 107 and these contact members or brushes press against the surface of either the insulating block 104 or the conducting member 105.

It will be apparent in Figure 13 that as the member 103 revolves, the insulating lock 104 will be in contact with the brushes 106 during approximately half a revolution and there will therefore be no current passing between the conducting cables 108.

On the other hand, during another half revolution of the shaft 102 the brushes will both be in contact with the face of the plate 105, which is of conducting material, so that the circuit will be closed between the brushes and current will be closed through the circuit which includes the wires 108.

These two wires are connected with any suitable source of current such as a battery or a main supply line and they are also connected with the spools of the magnet so that during approximately half a revolution of the shaft 102 the magnet is energized and during the other half revolution the magnets are de-energized. The time during which the magnet is energized corresponds with the time when the magnet is in position to attract a plate from the top of one of the stacks and until the plate is carried over the plate holder 2 and at that time the magnet is de-energized to drop the plate on the plate holder. The magnet remains de-energized from the time it drops the plate until it is swung back into position to grasp another plate from the top of the stack.

I have provided means for causing the magnet to hang in a horizontal position while the arms 5 are swinging back and forth or to the left and right in Figure 3. For this purpose I have provided a sprocket 110 fixed to the shaft 8 which carries the magnet. Around this sprocket engages an endless chain 111 which also engages around the sprocket 109 and the latter is fixed against turning in the following manner: The bearing member 112 formed in the stationary bracket 113 supports one end of the sleeve 114 which is held from turning by the set screw 115 extending through the member 112. This sleeve has a bore 116 to receive one end of the shaft 6 in which the shaft may freely revolve while the sleeve remains stationary.

The hub 117 which carries the arms 5 is mounted to revolve on the sleeve 14 between one end of the bearing member 112 and one end of the hub 118 of the sprocket wheel 109. The hub of the sprocket wheel is provided with a set screw 119 which engages the sleeve 114 thereby locking the sprocket wheel against revolving motion, although the hub 117 may nevertheless revolve in relation to the sleeve.

It will be apparent that when the arms 5 are swung from a position over the stack of plates to a position over a plate holder on the turret, or vice versa, the sprocket 110 carried by the shaft 8 will move in an arcuate path, the center of which is the axis of the shaft 6. As the sprocket wheel 109 is held against rotation it will be apparent that when the sprocket 110 is making this arcuate movement it will be revolved because of its movement in relation to the stationary sprocket 109. The revolving movement of the sprocket 110 will cause the shaft 8 to oscillate in such manner that the magnet carried by this shaft will remain in a horizontal position while the plate carrier is moving back and forth alternately over the stack of plates and the holders 2. Therefore, a plate will be held in a horizontal position by the magnet while moving from the stack of plates onto the plate holder.

Operation

When the main shaft 64 is driven it not only revolves the turret of the pie making machine as shown herein, but in addition the main shaft drives the various mechanisms for feeding the plates. The operations of many of the parts have been described above but I will outline the various movements which take place during one complete cycle of the plate feeding device.

Let it be assumed that the plates 101 in Figure 4 are the last two plates of a stack which has been fed upwardly by the rising movement of the post 19. At this time or previous to this time the operator will place a new stack of plates between the posts 17 and resting on the head 23 carried by the post 22. This he may readily do because these posts 17 are shifted out of operative position and are therefore in position to receive a new stack of plates. Preferably, the stack will consist of a definite number of plates, say one hundred.

During one complete cycle of the machine, the rack bar 10 will rise and fall due to the crank motion imparted to it by the sprocket 13. This will cause the plate lifting device, including the arms 5, to swing from the position shown in Figure 3 in a counterclockwise direction until the magnets and the plate are moved over one of the plate holders 2 of the turret and then the plate carrying device swings back to the position shown in Figure 3.

While the plate lifting device is thus swinging back and forth from one position to the other, the magnet remains suspended instead of revolving about the shaft 8. This is due to the fact that the chain 111 which engages over the stationary sprocket 109 causes the shaft 8 to turn sufficiently while the arms 5 are swinging, to retain the magnet device in the same vertical position throughout the movement of the arms 5.

While the plate lifting device is in the position shown in Figure 3, the lifting magnet is energized because the plate 105 on the contact control engages the brushes 106 and thereby closes the circuit which includes the magnet. This circuit remains closed while the magnet is lifting the plate from the top of the stack so that the plate is carried over by the magnet to the position over the plate holder and when the plate is directly over the plate holder the circuit is broken by the disengagement of the contact member 105 from the brushes, whereupon the plate falls upon the plate holder to be carried around by the latter. The circuit remains broken until the plate holder again returns to the position shown in Figure 3, ready for a succeeding operation. The means for transmitting power to the sprocket 13 has been previously described.

The ratchet wheel 28 is designed to have teeth corresponding in number with the number of plates in the stacks which are applied to the carriage, and for convenience in description it may be assumed that there are one hundred teeth on this ratchet wheel and that each stack of plates placed upon the carriage will consist of one hundred plates. At each revolution of the crank pin 55 traveling with the sprocket wheel 57 the lever 54 will be rocked and the pawl 59 will advance the ratchet wheel 28 one tooth.

This will elevate the post 19 one step or the thickness of one plate at each operation, so that as a plate is lifted from the top of the stack the stack itself is raised to bring the next succeeding plate into the same position as the one removed. Assuming that a new stack has been supplied to the carriage between the posts 17 it will be apparent that after two more plates have been removed from the platform on the top of the post 19 the stack of plates between the posts 18 will become exhausted.

The operation of the carriage shifter is so timed that as the last plate is about to be taken from the above post 22 the pawl 75 will be tripped to unlock the disc 71 and immediately after the tripping member 84 engages the pin 86, and shifts the lever 82 to the left in Figure 3 and to the right in Figure 5; and this will cause the pin 81 to act on the cone member 79 and shift it to the right in Figure 5 or to the left in Figure 3, so that the cone acts on the clutch arms 78 to throw the friction clutch into operation and to hold it so momentarily.

As soon as the clutch is thrown into operation the shaft 72 and the disc 71 will be revolved until they have completed one half revolution, whereupon the pawl 75 will reengage in the notch 73 of the disc 71, opposite to that from which it had just disengaged, so that the pawl will stop the disc after one half revolution. During the half revolution of the disc just described, the link 68 connected with it will have shifted the carriage along its tracks 15 so that the new stack of plates supplied over the post 19 and between the posts 18 will be brought into plate feeding position; and the post 22 will be moved to the right and away from plate feeding position. A new stack of plates may then be placed between the posts 17 ready to be shifted into plate receiving position.

Before the carriage was shifted in the above operation, the gear 43 was being revolved with the shaft 25 through the action of the clutch members 41, 42. At such time the gear 37 remained idle. When the carriage was shifted to the right in the above operation, the clutch 41 was disengaged from the clutch 42 and the post 22 was allowed to descend by gravity because there was then nothing to restrain the turning of the gear 43 in the reverse direction to its feeding operation.

When the post 22 falls down by gravity, the action is cushioned by reason of the action of the washer 49 forcing air through the small port 53. When the carriage was shifted to the right in Figure 7 in the above operation, the clutch member 36 was thrown into engagement with the clutch member 33 as the post 19 came into plate feeding position. The gear 37 is now revolved with the shaft 24 step by step so that the post 19 with its stack of plates is raised step by step in timed relation with the plate feeding operations. On the next half revolution of the disc 71 the pitman 68 is moved to the left to the position shown in Figures 2 and 7, and this brings the post 22 into plate feeding position and the post 19 away from feeding position, or in other words, the parts are restored to the position shown in Figure 7.

It will thus be apparent that the carriage is automatically shifted from one position to the other just as the plate feeding device takes the last plate of the stack for delivery onto the plate holder, so that a new stack of plates is fed into position as soon as the preceding stack has been fed.

The shafts 24, 25 which cause the feeding of the stack of plates are operated, as above described, by the action of the pawl 59 on the ratchet wheel 28. Retrograde movement of this ratchet and of the shafts 24, 25 is prevented by the holdback pawl 30 which escapes over the teeth of the ratchet wheel 29 on the shaft 24.

By having the power for operating the different branches of the present mechanism taken directly or indirectly from the power shaft 64, from which the turret is operated, the movements of the various parts of the plate lifting device synchronize with the movement of the plate holders so that one of the latter is in position to receive the plate at the time the plate carrier presents a plate over the holder.

It will be apparent from the above that I have provided an automatic plate feeding device for feeding plates singly from a stack onto a holder and that the only operation to be carried out by the attendant is that of supplying stacks of plates to the carriage as the latter is shifted into position to receive the stack. By having means for holding a plurality of stacks of plates on the carriage, which are alternately replenished, the plate feeding device may operate continuously or in other words, it need not be stopped to receive a fresh supply of plates.

While I have described my invention as applied to a machine for feeding plates to holders, it is apparent that other metallic objects may be fed to or from receiving means.

Having described my invention, what I claim is:

1. An apparatus of the character described, including means for supporting a stack of plates in proximity to a traveling support, a shaft, arms carried thereby, an electromagnet carried by said arms and adapted to take a plate from said stack and deliver it onto said support, a gear on said shaft, a rack bar for operating said gear, a second shaft having crank means for operating said rack bar, a revolvable circuit controlling member mounted on said second shaft and brushes co-operating with said circuit controlling means whereby said electromagnet will be alternately energized and de-energized by the action of said circuit controlling means.

2. An apparatus of the character described, including a movable support, a pivotally mounted plate lifter arranged to take plates from a stack and to deliver them on said support, a carriage adapted to hold a plurality of stacks of plates, means for moving said carriage to bring the stacks of plates successively into position to be fed by said plate feeding device, and means for feeding the stacks upwardly to said plate lifting device while the stack is in position to be acted upon by said plate lifting device.

3. An apparatus of the character described, including a traveling support, a pivotally mounted plate lifter arranged to take plates from a stack and to place them on said support, and a carriage adapted to hold a plurality of stacks of plates, means on said carriage for lifting the individual stacks of plates and means for shifting said carriage to bring the stacks of plates successively into position to be fed by said plate lifting device, and means for automatically operating said stack lifting means while in plate feeding position and to allow the same to descend when said carriage is shifted, whereby the stack lifting means will be in position to receive a new stack of plates when moved out of plate feeding position.

4. An apparatus of the class described including means for supporting a stack of plates in proximity to a traveling support, a pivotally mounted plate lifter arranged to take the plates from a stack and to deliver them upon said support, a movable carriage adapted to hold a plurality of stacks of plates, bars for individually lifting said stacks of plates, said bars having racks thereon, gears for operating said racks and means for shifting said carriage to bring the stacks of plates successively into position to be fed by said plate lifter.

5. An apparatus of the character described, including a traveling support, a pivotally mounted plate lifter arranged to take plates from a stack and to place them on said support, a movable carriage having a plurality of vertically moving posts for individually lifting the stacks of plates, means for shifting said carriage to bring the stacks of plates successively into position to be fed by said plate lifter, means for raising said posts when in plate feeding position and adapted to release said posts when the stack of plates mounted thereon has been fed, and dashpots for cushioning the downward movement of said posts.

6. An apparatus of the class described, including a traveling support, a pivotally mounted plate lifter arranged to take the plates from a stack and to feed them onto said support, a reciprocating carriage adapted to hold a plurality of stacks of plates, vertically movable posts on said carriage for lifting the individual stacks, means on said carriage for operating said posts when in plate feeding position, shafts, clutch members on said shafts and co-operating clutch members on said carriage, means for reciprocating said carriage to bring the stacks of plates successively into plate feeding position and for throwing said clutch members into and out of operative relation, whereby said posts will be in operative relation with said shafts when in plate feeding position.

7. An apparatus of the character described including a traveling support, a pivotally mounted plate lifter arranged to take plates from a stack and place them on said movable support, a carriage adapted to hold a plurality of stacks of plates, posts for individually lifting said stacks in relation to the plate lifting means, parallel shafts having oppositely arranged clutch members thereon, gears on said carriage for raising said posts, clutch members associated with said gears and adapted to alternately engage the clutch members on said shafts, and means for reciprocating said carriage to bring the stacks of plates successively into plate feeding position and to alternately throw said clutch devices into and out of operation whereby each post will be rendered operative when in plate feeding position.

8. An apparatus of the class described, including a traveling support, a pivotally mounted plate lifter adapted to take plates from a stack and to deliver them on said support, a carriage adapted to hold a plurality of stacks of plates, means for shifting said carriage to bring the stacks of plates successively into plate feeding position, means for raising said stacks when in plate feeding position, and means for operating said last mentioned means step by step.

9. An apparatus of the class described, including a traveling support, a pivotally mounted plate lifter adapted to take plates from a stack and to deliver them on said support, a carriage adapted to hold a plurality of stacks of plates, means for shifting said carriage to bring the stacks of plates successively into plate feeding position, means for raising said stacks when in plate feeding position, and means for operating said last mentioned means step by step, including a ratchet wheel having teeth corresponding in number to the number of plates in the stacks on said carriage, and means including a pawl for engaging said ratchet wheel to move the same step by step.

10. An apparatus of the class described including a traveling support, a pivotally mounted plate lifter arranged to take plates from a stack and place them on said support, a movable carriage adapted to hold a plurality of stacks of plates, means for individually lifting each stack in relation to the plate lifting means, means for shifting said carriage to bring the stacks of plates into plate feeding position and means for locking said carriage periodically and for unlocking said carriage to permit it to be shifted when a stack of plates has been fed therefrom in order to permit a successive stack to be moved into plate feeding position.

11. An apparatus of the character described, including a pivotally mounted plate lifter arranged adjacent a movable support, said lifter arranged to take plates from a stack and to place them on said support, a carriage adapted to hold a plurality of stacks of plates, a revolvable member and a pitman connected therewith and with said carriage whereby said revolvable member shifts said carriage to bring successive stacks of plates into feeding position, means for locking said revolvable member to hold the carriage while one stack is being fed and to unlock said revolvable member to permit said carriage to be shifted, and means for automatically operating said revolvable member when it has been unlocked for the purpose of moving said carriage.

12. An apparatus of the character described, including a pivotally mounted plate lifter arranged to take plates from a stack and to place them on a movable support, a movable carriage for holding a plurality of stacks of plates, means on said carriage for feeding the stacks of plates upwardly to said plate lifting means, a revolvable notched disc and means operated thereby for shifting said carriage, means for locking and unlocking said disc, means for revolving said disc when the same is unlocked, a ratchet wheel for operating the stack lifting means and a pawl for operating said ratchet wheel and means carried by said ratchet wheel for unlocking said disc and for throwing said disc operating means into operation.

13. An apparatus of the character described, including a plate lifter arranged to take plates from a stack and to place them on a movable support, a carriage adapted to hold a plurality of stacks of plates, means for lifting said stacks in relation to the plate lifter, a notched disc and means connected therewith for reciprocating said carriage, a pawl for locking said disc, a slip clutch for revolving said disc, means for operating said stack lifting means including a ratchet wheel and a pawl for operatng the same step by step, and means carried by said ratchet wheel for releasing the pawl which locks said disc, said ratchet wheel having means for throwing said slip clutch into operation after said disc has been unlocked.

14. An apparatus of the character described, including a carriage adapted to hold a plurality of stacks of plates, an oscillating plate lifter adapted to take the plates from said stack and to feed them onto a support, means for shifting the carriage to bring individual stacks of plates successively into feeding position, means for locking said carriage in its different positions, means on said carriage for lifting the individual stacks toward the plate lifting device, a shaft and means operated from said shaft for operating said plate lifter for moving said carriage and for operating said stock lifting means.

JOHN F. KOHLER.